(12) United States Patent
Ubidia

(10) Patent No.: US 10,837,439 B2
(45) Date of Patent: Nov. 17, 2020

(54) DOSING PUMP SYSTEM

(71) Applicant: Fernando A. Ubidia, Ludlow, MA (US)

(72) Inventor: Fernando A. Ubidia, Ludlow, MA (US)

(73) Assignee: Micro Infinity Flow, LLC

( * ) Notice: Subject to any disclaimer, the term of this patent is extended or adjusted under 35 U.S.C. 154(b) by 0 days.

(21) Appl. No.: 16/108,148

(22) Filed: Aug. 22, 2018

(65) Prior Publication Data

US 2018/0355861 A1    Dec. 13, 2018

Related U.S. Application Data

(62) Division of application No. 14/959,019, filed on Dec. 4, 2015, now abandoned, which is a division of
(Continued)

(51) Int. Cl.
*F04B 49/24* (2006.01)
*F04B 49/22* (2006.01)
(Continued)

(52) U.S. Cl.
CPC .............. *F04B 49/24* (2013.01); *F04B 13/00* (2013.01); *F04B 43/04* (2013.01); *F04B 49/20* (2013.01); *F04B 49/225* (2013.01); *F04B 53/10* (2013.01); *F04B 53/16* (2013.01); *F04C 2/344* (2013.01); *F04C 14/08* (2013.01); *F04C 14/26* (2013.01); *F04C 15/008* (2013.01); *F04D 13/06* (2013.01); *F04D 15/0011* (2013.01); *F04D 15/0066* (2013.01); *F04D 29/18* (2013.01); *G01F 1/34* (2013.01); *Y10T 137/85978* (2015.04)

(58) Field of Classification Search
CPC .... F04B 49/24; F04B 2205/151; F04B 49/06; F04B 49/065; F04B 53/10; F04B 53/16; F04B 2203/02; F04B 2203/04; F04C 2/344; F04C 14/08; F04C 14/26; F04D 29/18; F04D 13/06; F04D 15/008; F04D 15/0011; F04D 15/0066; G05B 2219/37317; G05B 2219/37318; H02P 5/46; H02P 6/182; H02P 2205/07
See application file for complete search history.

(56) References Cited

U.S. PATENT DOCUMENTS 4,241,299 A    12/1980   Bertone
4,756,321 A    7/1988    Livingston et al.
(Continued)

*Primary Examiner* — Philip E Stimpert
(74) *Attorney, Agent, or Firm* — Aronberg Goldgehn Davis & Garmisa

(57) ABSTRACT

A compact, modular dosing pump system that is capable of microdose and macrodose volume flow rates, reduces or eliminates the need for additional flow control components such as temperature and pressure sensors, and utilizes a wider operational flow range than existing systems while maintaining the level of accuracy and precision exhibited by conventional dosing pump systems is provided. The dosing pump utilizes a a control system to deliver a range of fluid volumes. The control system monitors the motor emf voltage, calculates the flow rate, and makes adjustments to the pump motor voltage to precisely maintain the desired flow-rate.

12 Claims, 6 Drawing Sheets

Related U.S. Application Data application No. 13/589,932, filed on Aug. 20, 2012, now Pat. No. 9,234,512.

(60) Provisional application No. 61/542,628, filed on Oct. 3, 2011.

(51) Int. Cl.

| | |
|---|---|
| *F04B 53/16* | (2006.01) |
| *F04B 49/20* | (2006.01) |
| *F04B 53/10* | (2006.01) |
| *G01F 1/34* | (2006.01) |
| *F04B 13/00* | (2006.01) |
| *F04B 43/04* | (2006.01) |
| *F04C 2/344* | (2006.01) |
| *F04C 14/08* | (2006.01) |
| *F04C 14/26* | (2006.01) |
| *F04C 15/00* | (2006.01) |
| *F04D 13/06* | (2006.01) |
| *F04D 15/00* | (2006.01) |
| *F04D 29/18* | (2006.01) |

(56) References Cited

U.S. PATENT DOCUMENTS

| | | | |
|---|---|---|---|
| 5,360,320 A * | 11/1994 | Jameson | G01N 30/34 210/101 |
| 5,415,532 A | 5/1995 | Loughnane et al. | |
| 2008/0131295 A1 | 6/2008 | Koehl | |
| 2011/0054810 A1 * | 3/2011 | Turner | A61M 1/0031 702/47 |
| 2014/0305316 A1 | 10/2014 | Sevcik et al. | |

\* cited by examiner

DOSING PUMP SYSTEM

CROSS-REFERENCE TO RELATED APPLICATION

This application is a divisional application of, and claims priority to U.S. patent application Ser. No. 14/959,019 filed Dec. 4, 2015 which is a divisional application of and claims priority to U.S. patent application Ser. No. 13/589,932 filed Aug. 20, 2012 which claims priority to U.S. Provisional Application Ser. No. 61/542,628 filed Oct. 3, 2011, the entirety of all of which are incorporated herein by this reference.

FEDERALLY SPONSORED RESEARCH OR DEVELOPMENT

Not Applicable.

BACKGROUND OF THE INVENTION

The present invention generally relates to devices capable of delivering precisely metered fluid volumes. Specifically, the invention includes a pump that may provide both a microdose and macrodose so as to accurately deliver a precise volume of fluid with high resolution adjustment over a wide range of microdose and macrodose volumes. The invention can be configured for use in fields which include medical, pharmaceutical, food and beverage, industrial process, laboratory, and chemical, as well as commercial and consumer applications.

Precise dosing pump systems are complex and expensive systems, are highly specialized, and are limited to particular applications. The highly specialized nature of dosing pumps systems limits their performance capabilities to a narrow range of operation. Furthermore, due to their high cost, dosing pump systems are typically limited to high-end applications in fields such as medical and industrial, while commercial and consumer applications have limited access to the technology.

Generally, dosing pumps are electrically powered devices, and may be operated utilizing several technologies such as solenoids, gears, a diaphragm and peristaltic actuation. Regardless of the pump technology, however, dosing pumps are typically designed for and limited to providing very low flow rates such as 0.01 millileters per minute to 5 milliliters per minute. In these prior systems, the low flow rate is necessary in order to precisely control the output of the fluid. The drawback to the low flow rate, however, is that dosing pump systems have a limited range of adjustability such that they are not effective to operate outside of the nominal design flow rate. Use of a higher flow rate dosing pump, such as a pump that operates in a range of 20 milliliters per minute to 50 milliliters per minute, in order to expand the range of flow rates is typically not an option because the increased flow rate comes at the loss of accuracy and precision. Therefore, dosing pumps capable of precisely controlling macrodose flow are expensive and highly uncommon.

Both precise microdose pumps as well as macrodose pumps tend to be expensive. Also increasing the cost is the need of certain applications that require both microdosing and macrodosing because more than one pump is required to achieve all of the desired dosing ranges. Current dosing pumps lack the necessary degree of adjustability to cover large ranges of flow rate.

Further drawbacks of prior dosing pump systems are the variety of devices in addition to the pump that are required in order to monitor and control the flow of fluid. Flow meters, adjustable flow controls, pressure sensors, and temperature sensors are all needed in order for dosing pump systems to achieve their precision and monitor flow. These additional components contribute to the complexity and cost of the system, as well as add physical bulk.

The sensitivity of readily available flow sensors, such as turbine sensors, is also not sufficient for accurately determining the flow rate of fluids at microdosing levels, generally within the range of 0.01 milliliters per minute to 5 milliliters per minute. In the case of traditional turbine sensor, the microdose flow rate cannot adequately spin the turbine to generate sufficient signal to determine the actual flow rate of the fluid. Thus, In a traditional microdosing system, such flow sensors cannot be utilized because the pump operates to draw in and expel fluid at essentially the same microdosing rate resulting in an input flow and an output flow that are each at microdosing levels. In such systems, a specialized microdosing sensor must be utilized. Microdosing sensors have significant drawbacks such as a high cost, generally thousands of dollars. Additionally, they are often application specific and must be specially designed.

The selection of these components is typically based on achieving a nominal microdose or macrodose flow rate fluid to enable a specific dosing pump to expel fluids of a particular, narrow viscosity range. The design of the particular dosing system is thus limited to a particular flow rate for a particular fluid viscosity. If a change to the nominal flow rate is desired, or the viscosity of the fluid changes, the dosing pump must be re-engineered, or replaced altogether, along other components of the dosing pump system (flow controls, etc.) in order to maintain the precision of the system.

In summary, existing dosing pump systems can be configured to provide accurate, high-precision fluid delivery. However, this is achievable only within a narrow operational range and through the assembly of a complex and expensive flow control system.

SUMMARY OF THE INVENTION

The present invention provides a compact, preferably modular dosing pump system that is capable of microdose and macrodose volume flow rates, reduces or eliminates the need for additional flow control components such as temperature and pressure sensors, and flow meters, and utilizes a wider operational flow range than existing systems while maintaining the level of accuracy and precision exhibited by conventional dosing pump systems. In the preferred embodiment, the dosing pump utilizes a pump and flow circuit to deliver a range of fluid volumes. The flow circuit utilizes a networked system of fluid paths, orifices, and valves to route fluid through the dosing pump system in response to a pressure differential between fluid inlet and fluid outlet ports. Further embodiments of the invention include a flow circuit with one or more orifice size selectors and a flow circuit with a secondary, adjustable outlet flow orifice, and yet another embodiment of the invention includes a closed loop control system to monitor and control the dosing pump flow rate.

By utilizing the flow control circuit, the dosing pump achieves a level of precise flow control even when a standard, non-dosing rated fluid pump is used within the system. That is, pumps having wide variances in precision tolerance may be utilized in conjunction with the flow circuit and the dosing pump system will still achieve the narrow precision tolerance desired. This results in a number of advantages. For example, the range of adjustability of the flow rate is substantially greater than existing dosing systems. Also, the dosing pump system has the capability to precisely control microdose flow rates as well as macrodose flow rates. Furthermore, because a dosing rated fluid pump is not required, the cost of the fluid pump may be substantially reduced.

The dosing pump system described herein may be further enhanced by a control system. In order to control the operation of the dosing pump system, the controller, which is preferably a microprocessor based controller, monitors the operation of the pump motor. In so doing, the controller monitors the flow rate of the system and may make necessary adjustments to the pump's operation in order to adjust the flow rate of the dosing pump system. The controller may further monitor and control other operations of the dosing pump system such as total volume expelled. By utilizing the controller to monitor the pump operation, additional sensors such as pressure sensors, temperature sensors, and flow meters are not necessary and the overall bulk and cost of the dosing pump system may be reduced.

DETAILED DESCRIPTION OF PREFERRED EMBODIMENTS

Figure 1:
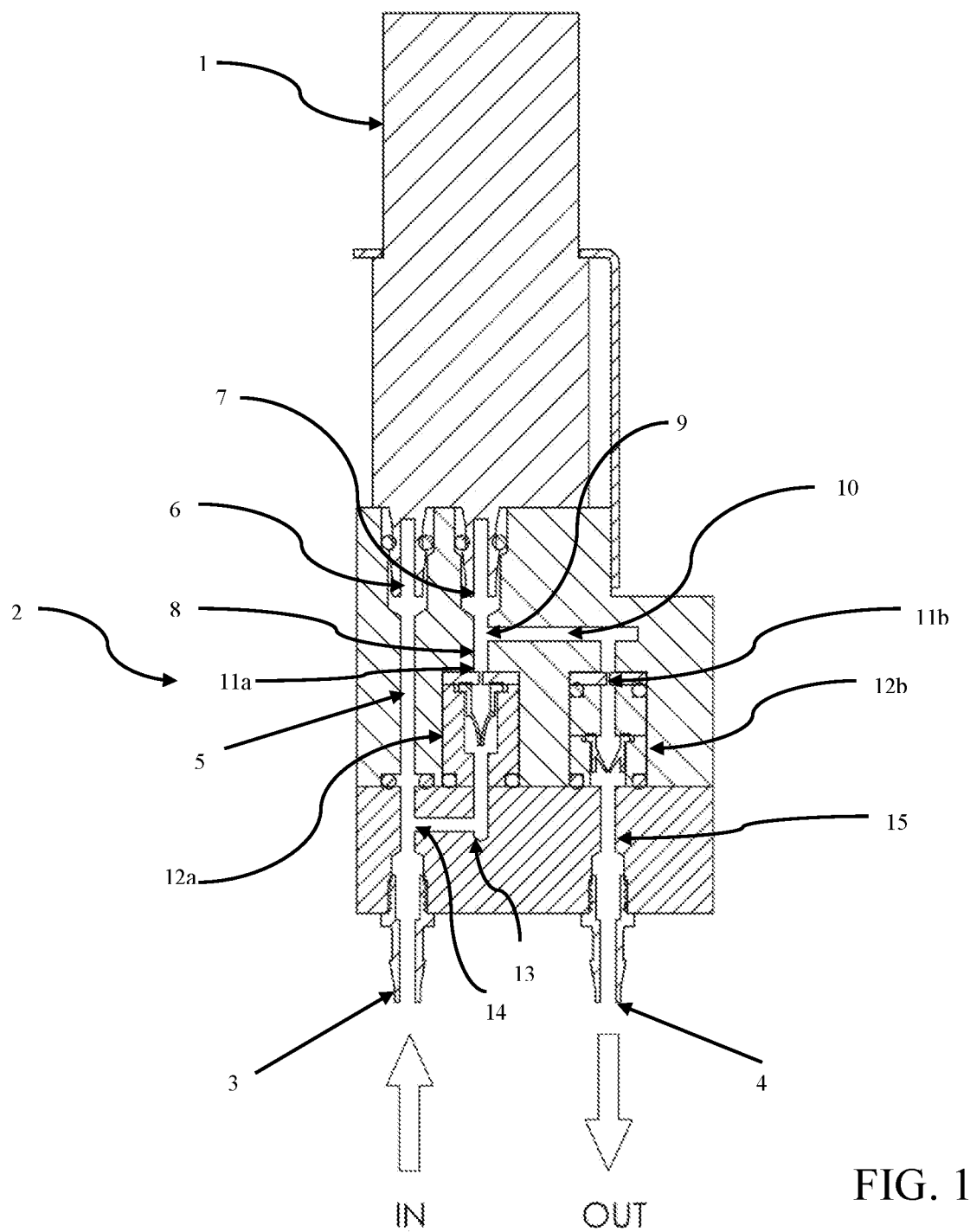
FIG. 1 is a sectional view of an embodiment of the dosing pump system.

The preferred embodiments of the present invention are described with reference to the drawings below. In the drawings, like numbers are used to refer to like elements. The construction of the dosing pump is comprised of two primary subsystems: a fluid pump and a flow circuit. A controller, which may be, and preferably is, a microprocessor based control system, may also be utilized to provide closed loop feedback control of the dosing pump system. The pump, flow circuit, and control system are assembled into a compact, modular dosing pump system. The dosing pump system includes a fluid inlet port to couple to a fluid source and a fluid outlet port to discharge the fluid; no flow control devices are required external to the dosing pump system.

Referring to FIG. 1, the fluid pump 1 is assembled to, and in fluid communication with, the flow circuit, generally identified as 2. The fluid pump 1 provides a pressure differential to move fluid through the system. The flow circuit 2 routes fluid in though a circuit fluid inlet port 3, through a network of flow passages of the flow circuit 2, and discharges fluid at a circuit fluid outlet port 4. The flow circuit 2 contains internal flow control features too, which may control the flow characteristics of the system.

Figure 2:
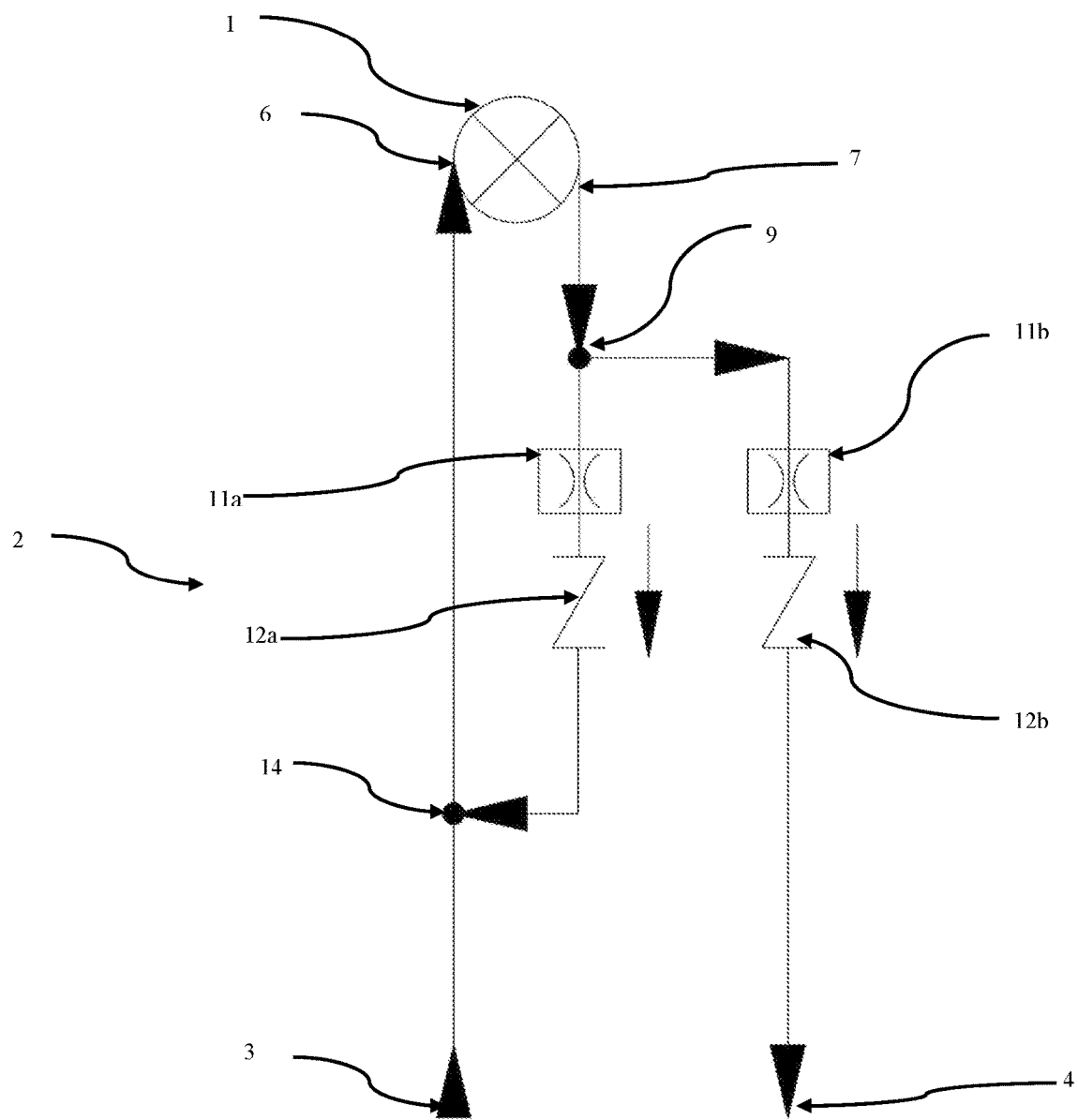
FIG. 2 is a schematic of an embodiment of the flow circuit.

Referring to FIG. 1 and FIG. 2, the two main features of the flow circuit 2 may be seen. The first is the flow bypass loop where fluid flow enters from inlet port 3 into an input flow channel 5 and then flows to the pump input 6 of fluid pump 1. The fluid then travels out of fluid pump 1 through pump output 7 and into output flow channel 8. The fluid then reaches a junction 9 in the flow circuit 2 at which point some of the fluid is diverted along an outlet branch flow channel 10 while the remaining fluid continues through output flow channel 8 to flow orifice 11a and through a bypass loop valve 12a. After passing through bypass loop valve 12a, the fluid flows through return channel 13 and is routed back to junction point 14 where it joins incoming fluid and is routed back through flow circuit 2.

As stated above, some of the fluid is diverted at junction 9. The diverted fluid flows from junction 9 along outlet branch flow channel 10 and then through a flow orifice 11b. The fluid then flows through an outlet branch valve 12b through exhaust channel 15 and out of the system through outlet port 4. As shown in FIG. 1, the junction 9, orifice 11a and bypass loop valve 12a connecting with junction point 14 creates a bypass loop in the flow circuit, while the junction 9, orifice 11b and outlet branch channel valve 12b create an output branch. It should be appreciated that the various flow channels interconnecting the components in the flow circuit may be of a variety of lengths. The flow channels are provided for explanatory purposes and depending on the desired configuration of the pump may be constructed as an indistinguishable part of another element. For example, the exhaust channel 15 could be shortened such that the outlet port 4 and the exhaust channel were one in the same. A relatively large flow rate develops within the bypass loop, while a lower flow rate develops through the outlet flow branch. The lower flow rate developed through the outlet flow branch is predictable and proportional to the flow rate though the bypass loop.

While orifice 11a and a bypass loop valve 12a are located within the bypass loop, outlet branch flow channel 10, orifice 11b and an outlet branch valve 12b are located within an outlet branch of the flow circuit 2. The sizes of the two flow orifices 11a and 11b determine the flow characteristics of the system, and they are sized according to the desired flow rate and the particular fluid properties of the application (e.g. the fluid viscosity). With respective flow orifice size selection, the flow circuit can precisely control a wide range of flow rates; from microdose flow rates up to macrodose flow rates. The bypass loop valve 12a within the bypass loop acts as an integral flow control device; its cracking pressure provides flow resistance and in turn creates a rise in pressure within the bypass loop. This contributes to flow rate proportioning between the outlet flow branch and the bypass loop.

The sizes of flow orifices 11a and 11b are selected based upon the properties of the fluid, primarily viscosity, and the intended flow rate range of a particular application. Once the orifice size selections have been made, the output flow from the dosing pump is precisely adjustable by means of varying the pump motor voltage. As the applied pump motor voltage is increased or decreased, the bypass loop maintains proportional flow between itself and the outlet flow branch, and the resulting outlet flow from the dosing pump increases or decreases linearly with respect the applied motor voltage. The linear response between pump motor voltage and dosing pump flow rate provides predictable, high resolution adjustment of the dosing pump output.

The linear relationship between the voltage applied to the pump motor and the subsequent dosing pump output flow rate is advantageous in instances where a dosing pump configured for a particular fluid viscosity and flow rate is used in different equipment configurations. For example, the dosing pump may be configured for a common fluid component used in a variety of equipment configurations. The different equipment configurations may locate the dosing pump at different flow distances from the dispensing point, and/or the equipment may have differences in their respective dispensing point; these are only two examples of dissimilar physical conditions between equipment configurations that are external to the dosing pump and that may impact the resultant fluid flow rate through the system. The dosing pump, however, can have its outlet flow rate predictably adjusted by means of pump motor voltage adjustment to yield the same system flow rate in the different equipment configurations.

Preferably, the bypass loop valve 12a and the outlet branch valve 12b are check valves. The flow resistance created by bypass loop valve 12a also allows the dosing pump to self prime. Both valves 12a and 12b function as back flow prevention devices. Preferably the cracking pressure of bypass loop valve 12a is greater than that of outlet branch valve 12b. In such a configuration, the higher cracking pressure of bypass loop valve 12a ensures that fluid is properly diverted at junction point 9, causing fluid flow through outlet branch valve 112b.

Figure 3:
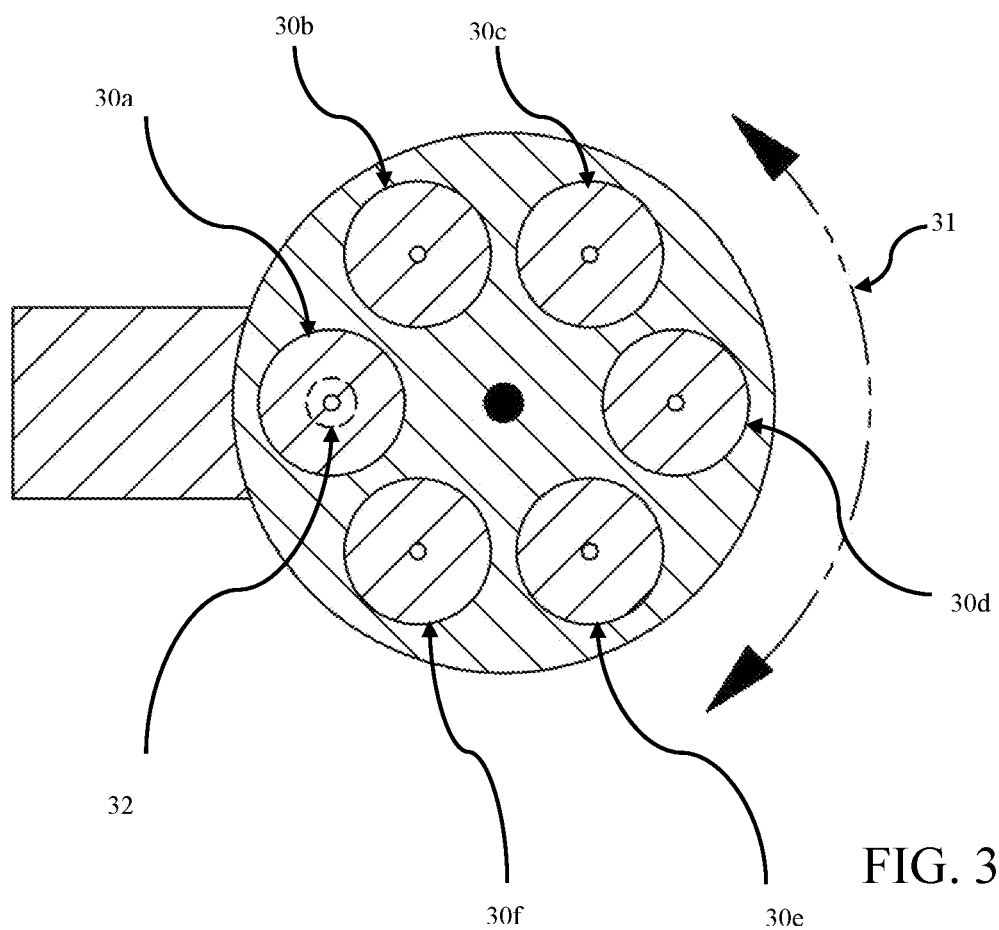
FIG. 3 is a sectional view of the orifice selector.

FIG. 3 pertains to an alternate embodiment of the present invention. Shown in FIG. 3 is a cross section of a flow circuit 2 including an orifice size selector 30. Additional orifice size selectors could also be included. The orifice size selector 30 further includes a plurality of flow orifices 30a, 30b, 30c, 30d, 30e and 30f arranged in an array. In the particular embodiment of FIG. 3, the orifice size selector may be rotated as indicated by arrows 31 so as to align one of the flow orifices into with flow path 32. The orifice size selector 30 may be included for either the bypass loop orifice or outlet flow branch orifice, or both. Preferably, the orifice size selector 29 may be placed at the inlet of bypass loop valve 12a, the inlet of outlet branch valve 12b or both. Essentially, it is preferred that the orifice size selector replace either of orifice 11a, orifice 11b, or both.

The inclusion of the orifice size selector 30 provides for a single flow circuit capable of several flow rate settings and compatible with several different fluid types. In the embodiment of FIG. 3, each setting is achieved by rotating the orifice selector to the appropriate orifice size for the particular setting. For example, the fluid circuit 2 including an orifice size selector 30 may be utilized in a dosing pump application where the dosing pump must pump different fluids, each with substantially different fluid properties. In use, the orifice size selector 30 is rotated so that the appropriate flow orifice is utilized for each fluid pumped through the system. Alternately, where a single dosing pump must accurately provide a microdose flow rate in some instances and a macrodose flow rate in others, the orifice size selector may be utilized to select the proper orifice sizes to supply the proper flow rates for both instances.

While the particular orifice selector depicted in FIG. 3 is substantially circular, having orifices arranged around its circumference, it should be appreciated that different sized and shaped orifice selectors could be utilized, such as a linear orifice selector that is reciprocated in order to select a proper orifice As presented in FIG. 1, the flow circuit may be constructed from an assembly of manifold bodies with internal flow paths; the manifold bodies being manufactured by, but not limited to, machined, cast, injection molded, or some combination thereof. Another embodiment of invention is a flow circuit with flow paths constructed from flexible or rigid tubing, or some combination thereof. Yet another embodiment of the invention is a flow circuit constructed from a combination of manifold bodies with internal flow paths and flexible or rigid tubing.

The fluid pump is not limited to a particular type of pump technology, and pumps such as diaphragm, gear, solenoid, rotary vane, flexible impeller, or other type of pump suitable for a particular application may be used.

Figure 4:
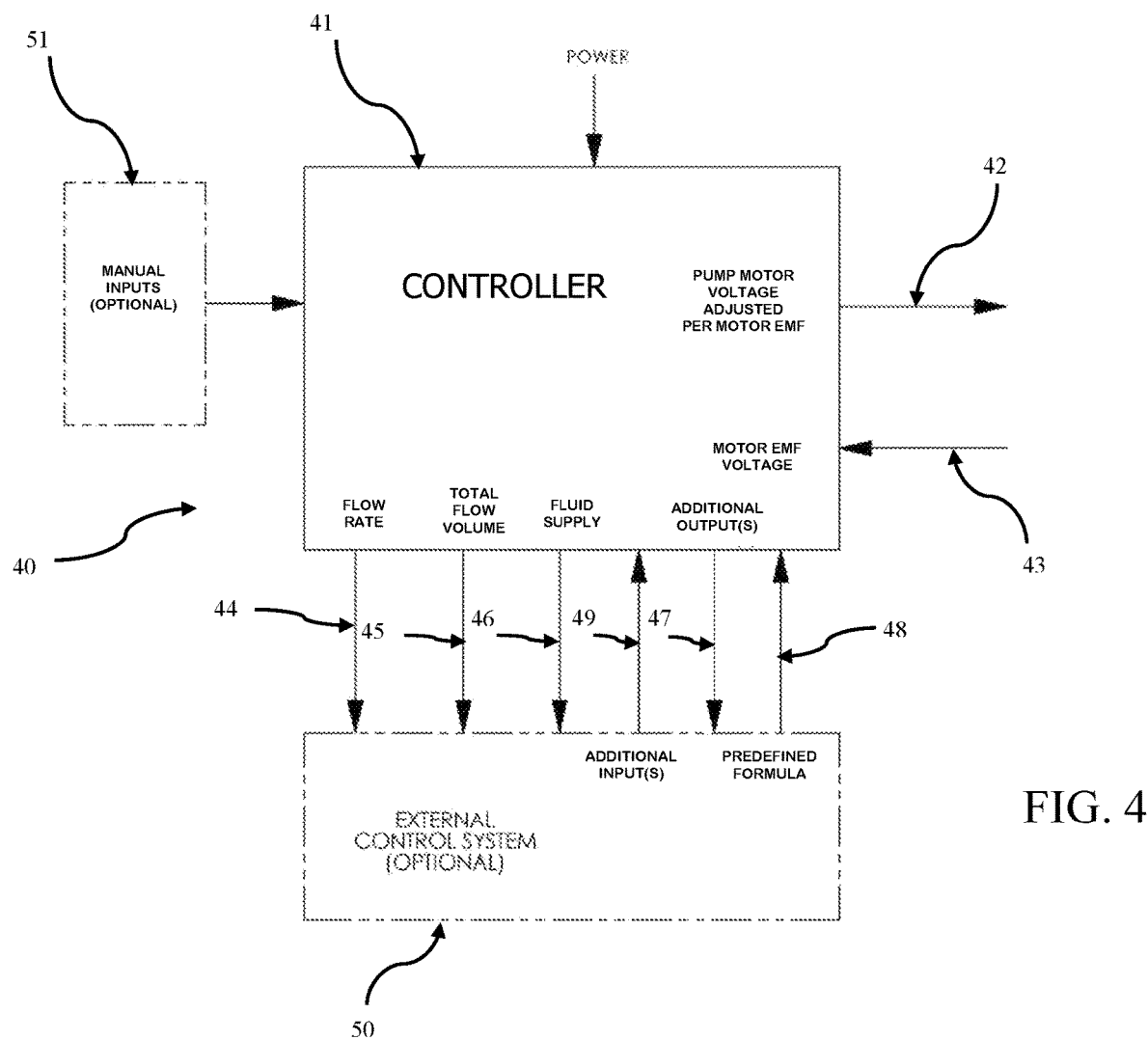
FIG. 4 is a schematic of the control system.

One embodiment of the present invention utilizes a closed loop control system in combination with the dosing pump system described above. FIG. 4 is a depiction of a control system 40 for use in combination with a dosing pump system. As shown, the controller is preferably a microprocessor based controller 41. The control system includes all functions necessary to operate the dosing pump system. The control system controls the power output to the pump motor (not shown), preferably through pulse width modulation (PWM) of the pump motor voltage 42, while monitoring the electrical behavior of the motor, specifically the motor Electromotive Force (emf) voltage 43, to provide closed loop flow control of the fluid flow. The motor emf voltage is proportional to the real-time discharge flow rate. By monitoring the motor emf voltage 43, the control system 41 calculates the flow rate and makes adjustments to the pump motor voltage 42 to precisely maintain the desired flow rate. Typically, dosing pump systems require flow rate sensors (such as paddle wheel or turbine type flow meters) to determine the fluid flow rate. By utilizing the pump motor emf 43, the present invention may determine flow rate without requiring the use of such additional flow sensors. Additionally, the control system 41 can use the flow rate information to calculate the total fluid volume that has been pumped.

Another advantage of sensing the motor emf voltage 43 is that the control system 41 can detect when the fluid supply to the pump has depleted. Typically, an additional device such as a pressure switch is required to detect when a supply of fluid has been depleted. By monitoring the changes in the emf voltage, the present invention can detect the depletion of the supply without any additional devices.

Preferably, the control system may included a normalization function which compensates for physical differences between individual pumps to ensure that the dosing pump's output flow rate is not affected by the physical differences of the motors. For instance, a particular pump model's motor windings may have minor physical differences between each motor which may result a variation in the emf voltage that the control system measures. The normalization function compares an input value, such as the actual emf voltage response, to a predetermined value, such as a predefined reference response, to determine an output value, such as an value corresponding to the appropriate pulse width modulation signal necessary to properly adjust the operation of the fluid pump, and the control system utilizes the output value to make the appropriate adjustments to correct for the variation. Thus, the control system through the utilization of the normalization function can correct for a wide range of different fluid types, flow rates, viscosities, etc, The control system may additionally feature inputs and outputs which can communicate with an external control system 50 of one or more devices, such as a computer or other controller. This communication may provide flow rate 44, total volume 45, and fluid supply information (such as a fluid supply empty signal) 46, as well as additional information 47 about the operation of the dosing pump. This allows the external device to alternately control the pump in several different fashions such as: turning the pump on or off; sending signals defining the flow rate the pump should run at; and sending signals of how much total fluid volume should be pumped. Another example is the control system receiving a predefined formula 48 from an external control device, the formula 48 containing information about one or more particular fluids. This information may include the volume of fluid to be pumped, the flow rate, as well as fluid property variables for correct emf vs. flow rate calculations. Furthermore, the control system may receive additional input signals 49 from an external control device, to serve a multitude of purposes; some examples include receipt of microprocessor firmware updates and test mode commands.

In turn, the control system may output information back to the external control device such as flow rate 44, total volume pumped 45, and fluid supply information (such as a fluid supply empty signal) 46. For example, a supply depletion signal may be sent from the control system to alert the external control device that the supply fluid has been depleted, allowing the external control device to take further actions. While the controller of the control system may receive and send input and output signals to an external control device 50, it is also contemplated that the control system may receive manual inputs directly from an input device 51, such as a keyboard, dial, mouse, or touch screen, and send outputs directly to an output device such as a display screen (not shown).

It is contemplated that the controller may be provided with a variety of predefined values which may be utilized by the controller, particularly in response to an input value, in order to control the operation of the pump system. For example, the controller may be provided with a set of output flow rate values. The output flow rate values may correspond to the desired flow rates for particular products to be pumped. The controller may receive an input, either from another controller, a manual input, or a sensor input, identifying the fluid to be pumped as a particular product or as having a particular characteristic. In response, the controller identifies the appropriate predefined output flow rate corresponding to the product information input and controls the operation of the pump system, such as adjusting the power to the pump or adjusting one or more orifice size selectors, such that the appropriate output flow rate is achieved.

The control system may also be configured to operate within a network of other controllers. Accordingly, a dosing pump such as that described above with respect to FIG. 1, may be configured to operate in conjunction with a control system, also as described above. A plurality of dosing pumps, so configured may be connected together into a network of controllable dosing pumps. Preferably, the controller, or control system, of each dosing pump in the network may be preprogrammed with a defined set of flow rates, each flow rate being assigned to a network address identification for a particular controller. The controller may be manually or automatically assigned a network address identification by means of physical electrical connection, software programming, or other known method. Once the network identifications have been assigned, each controller will then automatically drive the respective dosing pump to dispense the preprogrammed target flow rate for the respective network address whenever a "dispense" command is received by the controller. The dispense command may be received from an external control system or from a direct input to the controller.

The control system provides a high degree of precision that allows the dosing pump to operate within desired tolerances over a wide range of doses. The operation of the pump can be adjusted to increase fluid flow capacity by forcing a high volume of fluid through the system. For example, one embodiment of the present invention operates in a range of approximately 0.1 milliliters per minute up to approximately 600 milliliters per minute, the structure and control system being capable of adjusting the flow rate throughout the entire range.

The self contained nature of the preferred embodiment allows the dosing pump to be used either as a stand-alone component, or as modular device within a larger system. Requiring no external flow control devices or sensors allows the preferred embodiment to be easily adapted to a wide range of applications. For example, the dosing pump may be used stand-alone to manually add a dose of a chemical compound within an experimental laboratory application. Another example may be the invention used as one of a plurality of dosing pumps within an automated food processing device, with the invention's control system receiving flow rate and total volume information via an input signal from an external control system.

Figure 5:
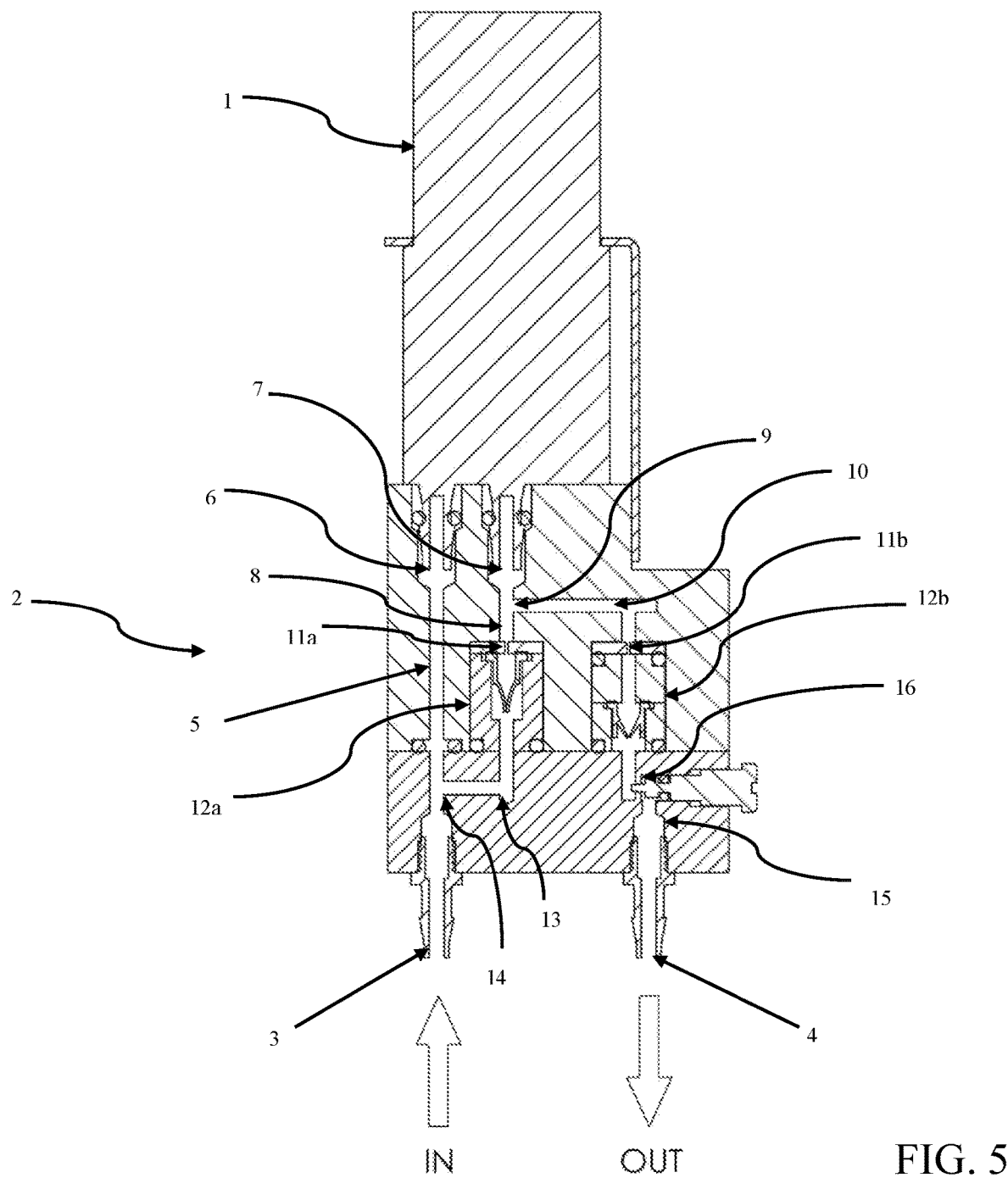
FIG. 5 is a sectional view of an alternate embodiment of the dosing pump system.
Figure 6:
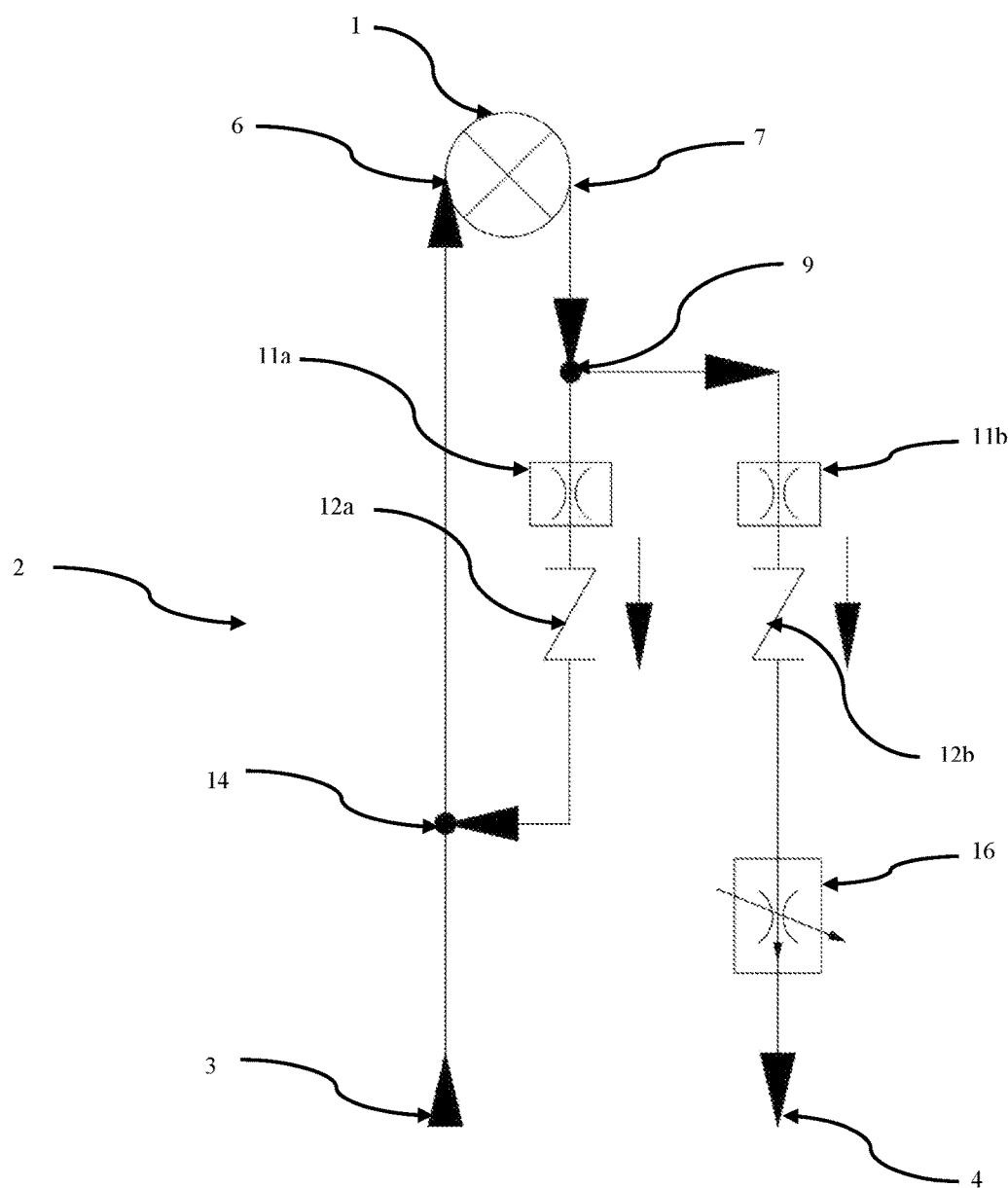
FIG. 6 is a schematic of an alternate embodiment of the flow circuit.

FIGS. 5 and 6 depict another embodiment similar to that depicted in FIGS. 1 and 2. As shown in FIG. 5, the embodiment includes a flow circuit 2 having a bypass loop and an outlet flow branch. However, the embodiment of FIGS. 5 and 6 further includes secondary exhaust orifice 16. The secondary exhaust orifice 16 may be in fluid communication with the outlet branch valve 12b and fluid exhaust channel 15. Preferably, fluid passed through outlet branch valve 12b, then through secondary exhaust orifice 16 before passing into exhaust channel 15 and out circuit fluid outlet 4. The secondary exhaust orifice 16 may be an adjustable valve, such as a needle valve. Alternately, secondary exhaust orifice 16 may be replaced with an orifice size selector, such as orifice size selector 30 of FIG. 3.

The secondary exhaust orifice, which is preferably adjustable, provides additional self priming capability for higher viscosity fluids (typically greater than 10 cP), as well as for applications where the dosing pump must draw fluid from a source or flow fluid to destination located at a relatively large vertical height differential from the dosing pump itself (i.e. vertical head). Without the secondary exhaust orifice 16, for high viscosity fluid and/or pumping against a large vertical head, there is potential for the pump to fail to create sufficient pressure to overcome the flow losses due to viscous effects, vertical head loss, and flow restriction of fluid attempting to pass through orifice 11b, resulting in a failure of the dosing pump to prime. Enlargement of orifice 11b reduces flow losses through the orifice, permitting the system to create fluid flow through the outlet branch, allowing the dosing pump to prime. However, enlargement of the orifice 11b sacrifices control of the fluid output once the pump is primed and system is sufficiently filled with fluid.

Accordingly, the addition of the secondary exhaust orifice 16 enables orifice 11b to be differently sized, including relatively large sized, in order to reduce the flow losses of fluid passing through orifice 11b, thereby allowing the dosing pump to initially prime, while maintaining control over the fluid flow rate through the outlet branch. The addition of secondary exhaust orifice 11b compensates for the loss of flow control resulting from the larger size of orifice 11b, enabling the dosing pump system to maintain the intended flow output that would be achieved with a smaller size of orifice 11b alone.

In operation, the combination of orifice 11b and secondary outlet orifice 16 provide additional self priming capacity in the following manner. When the pump 1 is energized and prior to the flow circuit being sufficiently filled with the fluid to be pumped, the relatively higher restriction created by the flow orifice 11a and bypass loop valve 12a in the bypass loop forces air to flow through the outlet flow branch with the relatively lower flow restriction created by the flow orifice 11b and the secondary exhaust orifice 16. As the air is forced through the outlet branch of the flow circuit, increased suction is created at the inlet 3 and the liquid being pumped is drawn into the pump 1, priming the pump. Once the flow circuit has become sufficiently filled with fluid, the higher viscosity of the fluid in comparison to air creates relatively large flow rate within the bypass loop and creates a lower flow rate within the outlet flow branch.

Another feature of the embodiment utilizing the preferably adjustable, secondary exhaust orifice 16 is the ability to adjust the restriction at the dosing pump outlet, allowing for an increased adjustment of the flow rate over a range of fluid viscosities. The embodiment of FIGS. 5 and 6 may, just as with the embodiment described with relation to FIGS. 1 and 2, further include a control system as described above. Similarly, the embodiment of FIGS. 5 and 6 may further include the orifice size selector 30, described above with relation to FIG. 3.

While, as discussed above, the controller of the pump system may control the operation of the pump through adjustment of the pump motor emf, it is recognized that it in many applications, it may be desirable to actually sense and determine the fluid flow in the input flow channel 5 (see FIGS. 1 and 5). A further embodiment of the present invention includes an additional flow rate sensor. In the dosing pump system described above, the flow rate may be monitored utilizing a traditional flow sensor even where the pump output is at a microdosing level. An example of a suitable traditional flow senor is the FT-110 Series turbine senor available from Gems Sensors and Controls located at One Cowels Road, Plainville, Conn. 06062.

As discussed above, the combination of the bypass loop and outlet branch allows the pump to operate at a relatively high velocity, regardless of the desired output of the pump system, such that a relatively high fluid flow is achieved in the bypass loop while a lower flow, and particularly a microdose flow, is achieved in the outlet branch. Referring now to FIGS. 1 and 4, for example, sensing the motor emf 43 of the pump motor will provide feedback information regarding the operation of the pump 1, and hence the volume of fluid dispensed through the outlet port 4. In the further embodiment, it is preferable that a traditional flow sensor (not shown) is placed in the input flow channel 5 between junction 14 and pump input 6 to sense the fluid flow though input flow channel 5. Due to the configuration of the flow circuit 2, when the pump system is operated to provide a microdose output flow at outlet port 4, a relatively high flow rate, greater than microdosing levels, develops in the bypass loop, and particularly through input flow channel 5. Because the flow rate is higher, the traditional flow rate sensor, despite a relatively low sensitivity, is capable of accurately sensing the flow rate of fluid in the input flow channel 5. The sensor may then output information respecting the flow rate to a controller of the dosing pump system.

Thus, in a practical application, for a given fluid, having known properties (such as a known viscosity), and for a desired output flow rate, the proportionality between the desired output flow and the bypass loop flow is known. The output flow of the dosing pump system may be calculated by the controller by utilizing the data output by a traditional flow sensor measuring the flow of fluid passing through input flow channel 5. The controller may also vary the voltage applied to the pump to adjust the output flow rate and thereby achieve the desired output flow.

Although the present invention has been described in terms of the preferred embodiments, it is to be understood that such disclosure is not intended to be limiting. Various alterations and modifications will be readily apparent to those of skill in the art. Accordingly, it is intended that the appended claims be interpreted as covering all alterations and modifications as fall within the spirit and scope of the invention.

What is claimed is:

1. A pump system comprising:
At least two controllers networked together;
a first fluid pump including a first motor and a first pump outlet branch orifice, a first controller of the at least two controllers being operably connected to said first fluid pump;
a second fluid pump including a second motor and a second pump outlet branch orifice, a second controller of the at least two controllers being operably connected to said second fluid pump;
wherein the first pump outlet branch orifice and the second pump outlet branch orifice have different dimensions;
wherein the first controller is configured to operate the first fluid pump to pump a first fluid having a first predefined flow rate;
wherein the second controller is configured to operate the second fluid pump to pump a second fluid having a second predefined flow rate;
wherein the first predefined flow rate and the second predefined flow rate are different;
wherein the first controller monitors a first motor electromotive force and controls the operation of said first motor by utilizing input data corresponding to the first predefined flow rate and by utilizing information pertaining to the first motor electromotive force to adjust a pulse width of a voltage applied to the first motor;
wherein the second controller monitors a second motor electromotive force and controls the operation of said second motor by utilizing input data corresponding to the second predefined flow rate and by utilizing information pertaining to the second motor electromotive force to adjust a pulse width of a voltage applied to the second motor; and
wherein the first controller includes a plurality of predefined motor electromotive force values, and a plurality of predefined fluid property values in addition to the first predefined flow rate and the second predefined flow rate; and wherein the first controller adjusts the pulse width of the voltage to be applied to the first motor by using at least one of the plurality of predefined motor electromotive force values and at least one of the plurality of predefined fluid property values.

2. The pump system of claim 1 wherein at least one of the first fluid pump and the second fluid pump further comprises one or more valves and wherein the one or more valves are only opened upon an application of sufficient pressure to the valves by the first fluid or the second fluid and only closed when there is an application of insufficient pressure to the valves by the first fluid or the second fluid to force fluid through the valves.

3. The pump system of claim 1 wherein the first controller generates a signal based on the first motor electromotive force indicating that a fluid supply for the first fluid pump is depleted.

4. The pump system of claim 1 wherein the first controller controls the operation of the first motor and the second controller controls the operation of the second motor without utilizing an input from a sensor that senses an actual fluid flow rate.

5. The pump system of claim 1 wherein the first controller includes a predefined value corresponding to a desired motor electromotive force and wherein said first controller modulates the voltage applied to the first motor based on a sensed motor electromotive force in order to reduce a divergence between the sensed motor electromotive force and the predefined value corresponding to the desired motor electromotive force.

6. The pump system of claim 1 wherein a flow rate of fluid exiting the first fluid pump is calculated by the first controller based on the information pertaining to the first motor electromotive force.

7. A pump system comprising:
At least two controllers networked together;
a first fluid pump including a first motor and a first pump outlet branch orifice, a first controller of the at least two controllers being operably connected to said first fluid pump;
a second fluid pump including a second motor and a second pump outlet branch orifice, a second controller of the at least two controllers being operably connected to said second fluid pump;
wherein the first controller is configured to operate the first fluid pump to pump a first fluid having a first predefined flow rate;
wherein the second controller is configured to operate the second fluid pump to pump a second fluid having a second predefined flow rate;
wherein the first predefined flow rate and the second predefined flow rate are different;
wherein the first controller monitors a first motor electromotive force and controls the operation of said first motor by utilizing input data corresponding to the first predefined flow rate and by utilizing information pertaining to the first motor electromotive force to adjust a pulse width of a voltage applied to the first motor;
wherein the second controller monitors a second motor electromotive force and controls the operation of said second motor by utilizing input data corresponding to the second predefined flow rate and by utilizing information pertaining to the second motor electromotive force to adjust a pulse width of a voltage applied to the second motor,
the first controller includes a plurality of predefined motor electromotive force values, and a plurality of predefined fluid property values in addition to the first predefined flow rate and the second predefined flow rate; and wherein the first controller adjusts the pulse width of the voltage to be applied to the first motor by using at least one of the plurality of predefined motor electromotive force values and at least one of the plurality of predefined fluid property values.

8. The pump system of claim 7 wherein at least one of the first fluid pump and the second fluid pump further comprises one or more valves and wherein the one or more valves are only opened upon an application of sufficient pressure to the valves by the first fluid or the second fluid and only closed when there is an application of insufficient pressure to the valves by the first fluid or the second fluid to force fluid through the valves.

9. The pump system of claim 7 wherein the first controller generates a signal based on the first motor electromotive force indicating that a fluid supply for the first fluid pump is depleted.

10. The pump system of claim 7 wherein the first controller controls the operation of the first motor and the second controller controls the operation of the second motor without utilizing an input from a sensor that senses an actual fluid flow rate.

11. The pump system of claim 7 wherein the first controller includes a predefined value corresponding to a desired motor electromotive force and wherein said first controller modulates the voltage applied to the first motor based on a sensed motor electromotive force in order to reduce a divergence between the sensed motor electromotive force and the predefined value corresponding to the desired motor electromotive force.

12. The pump system of claim 7 wherein a flow rate of fluid exiting the first fluid pump is calculated by the first controller based on the information pertaining to the first motor electromotive force.

* * * * *